Patented Dec. 15, 1942

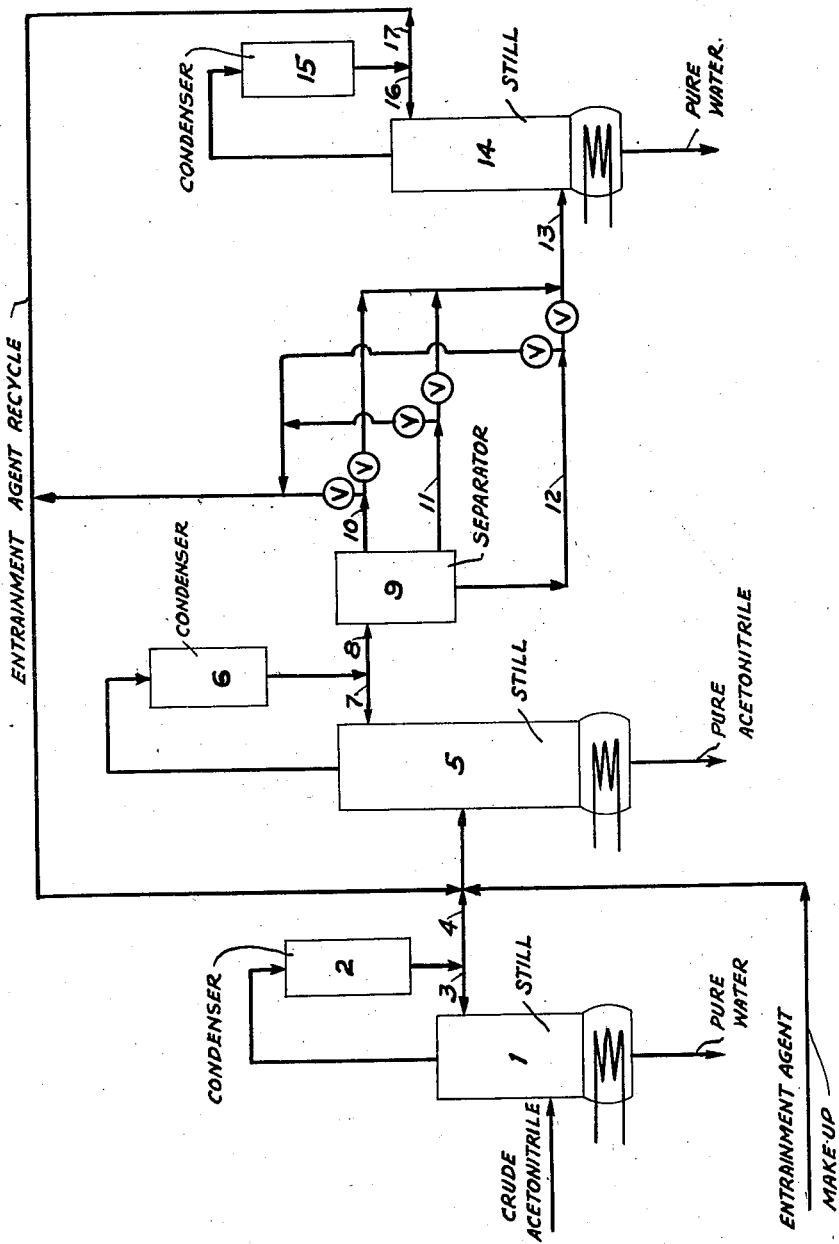

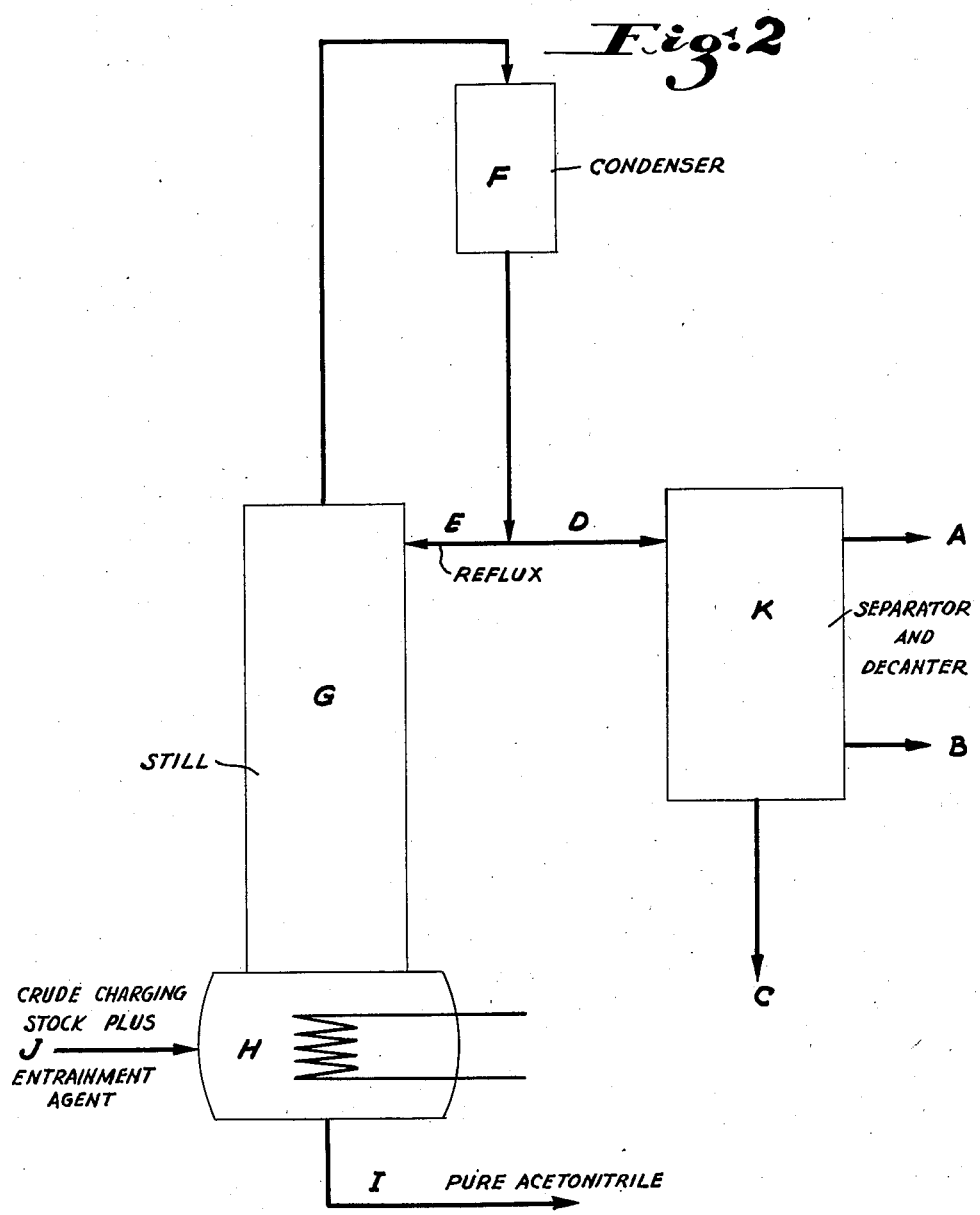

2,305,106

UNITED STATES PATENT OFFICE 2,305,106

MANUFACTURE OF ACETONITRILE

Henry Reginald Clive Pratt, Halewood, England, assignor to Imperial Chemical Industries Limited, a corporation of Great Britain Application April 19, 1941, Serial No. 389,331
In Great Britain April 29, 1940

7 Claims. (Cl. 202—42)

This invention relates to a process for the manufacture, and more particularly for the dehydration, of acetonitrile.

Methods are known for the manufacture of acetonitrile in which the product is contaminated with water, which it is necessary to remove in order to obtain a pure product. Is is also known that certain aqueous liquids such as aqueous alcohols, ethers, and esters can be dehydrated by adding a proportion of a third liquid, known as an entraining liquid, which forms with the water and a portion of the liquid to be dehydrated, a ternary azeotrope of lower boiling point than the liquid to be dehydrated, and distilling off the azeotrope. It is known that acetonitrile forms a low boiling binary with water. This binary contains 18% water, and thus water-free acetonitrile can be obtained from mixtures with water containing less than this percentage of water by distilling off the binary. This method, however, only enables part of the acetonitrile to be recovered in an anhydrous form and is inapplicable to water-acetonitrile mixtures containing more than 18% water. Hitherto, no generally applicable satisfactory method of achieving the dehydration of acetonitrile on an industrial scale has been devised.

I have now found that certain liquids form with water and acetonitrile a ternary azeotrope boiling below the boiling point of the nitrile, and I am thus enabled to provide a process in which these liquids are used as entraining liquids whereby acetonitrile containing any proportion of water can be dehydrated. Moreover, when, as is usually the case, these liquids are at most slightly soluble in water, it is possible, as hereinafter described, to achieve this result with substantially no net loss of acetonitrile as a binary with water or otherwise.

According to the present invention, therefore, a process for dehydrating aqueous acetonitrile includes the steps of adding to an aqueous acetonitrile an entraining medium which forms with water and with acetonitrile a ternary azeotrope boiling below the boiling point of the nitrile and removing the azeotrope in vapour form.

Liquids which have been found to be suitable as entraining media include hydrocarbons boiling between 60° C. and 145° C., particularly benzene and its lower homologues toluene and the xylenes. Petroleum hydrocarbon fractions having a boiling range of 60° to 80° C. or of 80° to 100° C. may also be used. Chlorinated aliphatic hydrocarbons boiling between 40° C. and 125° C. are also suitable, as for example carbon tetrachloride, trichloroethylene and perchloroethylene. Still further examples of suitable entraining liquids are carbon disulphide and lower alkyl esters such as ethyl acetate, ethyl propionate and propyl acetate.

I have further found that when employing an entraining liquid which has at most a low solubility in water, such as one of those specified above, the ternary azeotrope distilled over separates, after condensation, into layers, one of which contains at least the greater proportion of the water and another the greater proportion of the entraining liquid together with some acetonitrile; it is thus possible to separate the latter layer, as by decantation, and to return it to the distillation apparatus so that its nitrile content is recovered and the entraining liquid therein used to remove further quantities of water. The water layer can be rejected; alternatively, if the latter also contains quantities of the entraining liquid or of the nitrile which, though small, are worth recovery, it can be treated to recover those liquids; thus the layer can be heated to distil off the valuable liquids together with a small portion of the water, and the distillate added to a further quantity of nitrile to be dehydrated. Thus for the process as a whole, substantially all the acetonitrile is obtained in an anhydrous form.

In general the condensed ternary azeotrope separates into two layers, one much smaller than the other and containing most of the water. Thus, for example, in dehydrating acetonitrile with toluene the azeotrope separates into two layers, the lower of which is only 7% of the whole and contains substantially all the water removed from the nitrile, while when carbon tetrachloride is used as the entraining liquid, the upper layer is the smaller one, occupying only 6% of the total volume, and contains the water. It may happen, however, that more than two layers are formed which may be separated and rejected, returned to the process, or worked up to recover their constituents according to their composition. Thus when perchloroethylene is used as the entraining liquid the condensed azeotrope obtained, which boils at 71° C. separates into three layers, the top one of which contains most of the water and comprises about 4.5% of the whole, while the middle layer is essentially a solution of perchloroethylene in acetonitrile containing some water, and comprising about 70% of the whole (by volume) and the bottom layer is essentially a solution of acetonitrile in perchloroethylene. The top layer is rejected and the two lower layers returned to the process. If, as described hereinafter, a column still is used to effect the dehydration, these two layers may be returned to the same or to different points in the column.

The following table summarises the results obtained using typical entraining liquids which give an azeotrope forming two layers:

| Entraining liquid | Boiling point of the ternary azeotrope | Size of upper layer¹ | Size of lower layer¹ | Aqueous layer |
|---|---|---|---|---|
| | °C. | Percent | Percent | |
| Benezene | 66 | 92.5 | 7.5 | Lower. |
| Toluene | 72 | 93 | 7 | Do. |
| Trichloroethylene | 66 | 7 | 93 | Upper. |
| Carbon tetrachloride | 59 | 6 | 94 | Do. |
| Carbon disulphide | 39 | 15 | 85 | Do. |
| Ethyl acetate | 69–70 | 97 | 3 | Lower. |
| Propyl acetate | 73 | 95 | 5 | Do. |
| Petrol ether (B. P. 80–100° C.) | 52–62 | 83 | 17 | Do. |

¹ Expressed as a percentage of the volume of the azeotrope.

The wide boiling range of the ternary given above for the petrol ether is doubtless a reflection of the wide boiling range of the fraction used for the entraining liquid; I have found that it is preferable to use a petroleum fraction with a much closer boiling range than that given in the above table.

In one method of carrying out my invention there is added to a batch of acetonitrile containing a small amount of water sufficient of an entraining liquid to enable ternary azeotrope to be formed including all the water in the nitrile, and then heating the batch until all the azeotrope has been distilled off, leaving the remainder of the nitrile in the still free from water. The azeotrope distilled off is condensed, allowed to separate into layers and the layer containing the entraining liquid is used again to dehydrate further quantities of nitrile. If the entraining liquid is added in excess, the second fraction will in general consist of a binary azeotrope of the nitrile and entrainer, while if the amount is too small to entrain all the water, the second fraction will consist of the binary azeotrope of acetonitrile and water. In both cases the residue remaining in the boiler after distilling off the second fraction will consist of acetonitrile free from water. I prefer to avoid either an excess or a deficiency of the entraining liquid and to operate the process so that all of the water is removed as the ternary, since a greater proportion of the nitrile is then recovered in an anhydrous form.

The dehydration may also be conducted in a continuous manner by the use of a column still, the aqueous nitrile and the entraining liquid being introduced at suitable distances up the column, while vapours of the azeotrope are drawn off from the top and lead to a condenser and the dehydrated product is drawn off from the boiler. Part of the condensed azeotrope is returned to the column as refluxing liquid and the remainder is allowed to pass into a separating vessel where it separates into layers; supposing that there are two layers of which the upper one includes the greater portion of the entraining liquid and the lower one the water, the upper layer will be run off and returned to the upper part of the column still, while the lower layer is either rejected or led to a second still to recover the small amounts of the nitrile and/or entraining liquid which it contains. The second still may be either a batch-operated or a continuous one as desired, depending on the rate at which the lower layer accumulates. The supply of entraining liquid should be regulated in relation to the supply of moist acetonitrile so that sufficient is present to form a ternary azeotrope including substantially all the water in the acetonitrile; a smaller amount will result in incomplete dehydration. With a larger feed of entraining liquid some acetonitrile will also distil over as a binary with the former, and the capacity of the column still thus reduced. Temporary increases in the feed of the entraining liquid will, however, merely cause the latter to be held up in the central part of the column, since the entraining liquids in general form low-boiling binary azeotropes with the acetonitrile, and the product withdrawn from the boiler will not be contaminated with it. When subsequently the feed of entraining liquid is adjusted, the entraining liquid held up in the central part of the column will be consumed in the formation of the ternary azeotrope.

A suitable arrangement of apparatus for carrying out the dehydration of aqueous acetonitrile is shown in diagrammatic form in the accompanying drawings in which Figure 1 illustrates a schematic flow-sheet for continuous operation and Figure 2 similarly illustrates batch operation.

In Figure 1, a preliminary concentrating still 1, is provided to remove water from the crude acetonitrile in excess of the 18% water contained in the azeotrope. The low-boiling azeotrope is completely condensed in a condenser 2, a portion is returned to the head of the still 1 as reflux 3 and the remainder is mixed with entrainment agent 4 and fed into the purification still 5. Pure acetonitrile is removed from the pot of the purification still 5, and a low-boiling ternary mixture is taken overhead and completely condensed in a condenser 6. A portion of the condensate is returned 7 to the top of the purification still 5 as reflux, and the balance 8 is sent to a separator 9. Here the condensate is allowed to separate into two or three layers, which are decanted individually through three pipes 10, 11, 12. The water-rich phase is sent 13 to a recovery still 14 where pure water is discarded from the still pot and any entrainment agent or acetonitrile is taken off overhead, condensed in a condenser 15, a portion refluxed 16 and the balance returned through a conduit 17 to the purification still 5. The net effect of operating according to the flow sheet of Figure 1 is that crude acetonitrile and some make-up entrainer are continuously fed to the apparatus, while pure water and dry acetonitrile are continuously produced. If desired, the preliminary concentrating still 1 with its condenser 2 may be omitted, and the crude acetonitrile fed directly to the purification still 5.

In Figure 2, illustrating a schematic flow sheet for batch operation, the crude aqueous acetonitrile J is charged into the pot H of the still G, together with an entraining agent. Heat is then applied to the pot H and a low boiling ternary mixture is distilled overhead, into a condenser F. There the vapors are completely condensed, a portion of the condensate is refluxed E and the remainder D is sent to a separator K. In the separator K the ternary mixture stratifies into two or three layers which are drawn off through conduits A, B, C for further treatment as described below. After boiling the liquid in the still-pot H for a sufficient time, all the water and entrainment agent will be driven off as low boiling azeotropes, leaving pure acetonitrile which may then be drawn off through a conduit I.

The water-rich layer recovered from the separator k may be discarded, or preferably redistilled, through the same or similar apparatus to recover residual entrainer and acetonitrile. In this second distillation, pure water will be drawn off from the still-pot H through the conduit I, and the recovered hydrocarbon will be collected in the separator k.

The hydrocarbon-rich layer from the separator K is collected and recharged to the pot H of still G along with the succeeding batch of crude acetonitrile for purification.

The invention may be further described with reference to the dehydration of acetonitrile with benzene. A column still is set up having in the upper part an inlet for the crude acetonitrile to be dehydrated, and at the top an outlet by which vapours can be led off to a condenser. By means of suitable pipes and valves part of the condensate can be led back to the top of the still to act as a refluxing liquid and the remainder is diverted to a separating vessel. By means of further suitable pipes liquid can be drawn off from the upper part of the vessel and returned to the column, while the lower layer can be delivered to a suitable point in a second smaller column still. The vapours from this second still can be led to a condenser, and the condensate led back into the first still with the crude acetonitrile feed.

In using this apparatus moist acetonitrile and benzene are charged into the main still, and the still and condenser put into operation, so that only dehydrated nitrile remains in the boiler, azeotrope being distilled off and condensed, part being returned to the still as reflux and the remainder delivered to the separating vessel. Here two layers are formed, of which the upper one comprises 92.5% of the total volume and contains 75% benzene, 24.4% acetonitrile and 0.6% water, while the bottom layer contains 11.5% acetonitrile and a small amount of benzene, the remainder being water. The upper layer is returned to the still. When steady conditions are reached moist acetonitrile is fed to the column and the dehydrated product can be withdrawn continuously or periodically from the boiler. As the vapour of the azeotrope contains approximately ten times as much weight of benzene as of water, it is evident that the benzene should be supplied to the still at a rate which is ten times that of the water introduced in the acetonitrile. To maintain this rate in practical operation it will normally be necessary to supplement the return of benzene from the separating vessel by a small additional quantity to compensate for mechanical and other losses.

The water removed from the nitrile thus becomes transferred to the lower layer in the separating vessel; this liquid is drawn off and distilled in the second still to give a distillate consisting of a mixture of acetonitrile-benzene-water ternary with acetonitrile-water binary and this is fed back to the first still with the crude acetonitrile feed. The liquid from the base of the second still is water and is rejected.

Not only does benzene form the ternary azeotrope with water and the nitrile, but in addition it forms a binary azeotrope with the nitrile having a boiling point of 72.5° C., intermediate between that of the nitrile and of the ternary azeotrope. As a result, if benzene is temporarily fed to the column in excess of that required for the formation of the ternary azeotrope, it will not contaminate the product in the boiler, but will be held up in the central part of the column. When subsequently the feed of benzene is adjusted, as by altering the rate at which liquid is fed back from the separating vessel, the benzene held up in the lower part of the column will travel upwards and be used in the formation of the tenary azeotrope.

Acetonitrile containing various proportions of water is capable of being dehydrated by the steps of the present invention. Although the invention has to a great extent been described as applied to aqueous acetonitrile containing minor amounts of water, any modifications necessary to enable it to be applied to mixtures containing much greater proportions of water will readily be apparent. However, it has been found better in the treatment of mixtures containing considerably more water than the 18% corresponding to the content in the binary azeotrope, to distil off the binary of acetonitrile and water and distil the binary with the entraining liquid. Thus, in preparing acetonitrile by reacting alcohol with ammonia in the presence of catalysts, or by reacting acetic acid with ammonia in the presence of silica gel, a crude product is obtained containing in addition to traces of, e. g., ammonia, coisiderable quantities of water. Such crude acetonitrile may be dehydrated directly according to my invention. Preferably, however, vapours of the crude nitrile are first contacted in a tower with dilute acid, e. g., sulphuric acid, whereby the traces of ammonia are removed and the binary of acetonitrile and water is distilled off and can be distilled with the entraining liquid so as to give anhydrous nitrile. In this way a preliminary concentration is achieved, and in addition a crude product of constant composition is fed to the second part of the process involving the use of the entraining liquid; as a result it is easier both to set up and to maintain the most efficient operating conditions, irrespective of any variations in the composition of the crude nitrile fed to the first part of the process.

I claim:

1. In the process of removing water from aqueous acetonitrile the step which comprises adding to the aqueous acetonitrile a hydrocarbon boiling between 60° C. and 145° C. in amounts which form with the water therein and with part of the nitrile a ternary azeotrope boiling below the boiling point of the nitrile, and distilling off the azeotrope.

2. A continuous process for dehydrating aqueous acetonitrile which comprises the steps of continuously feeding to a column still both the aqueous acetonitrile to be dehydrated and a hydrocarbon boiling between 60° C. and 145° C. in amounts which form with the water in the said acetonitrile and with part of the acetonitrile a ternary azeotrope boiling below the boiling point of the acetonitrile, operating the still so as to distil off the ternary azeotrope and to leave in the lower part thereof acetonitrile substantially free from water, and removing from the still said acetonitrile substantially free from water.

3. A continuous process for the dehydration of acqueous acetonitrile which comprises the steps of feeding to a column still both the aqueous acetonitrile to be dehydrated and a hydrocarbon boiling between 60 and 145° C., operating the still so as to distil over a ternary azeotrope consisting of the hydrocarbon, the water in the aqueous acetonitrile and part of the acetonitrile, and to leave in the lower part of the still acetonitrile substantially free from water, removing from the still said acetonitrile substantially free from water, allowing the distilled ternary azeotrope to separate into two layers, the upper of which contains the major proportion of the hydrocarbon and the lower one the major proportion of the water, removing the upper layer and returning it to an intermediate point of the column still.

4. A continuous process for the dehydration of aqueous acetonitrile which comprises the steps of feeding to a column still both the aqueous acetonitrile to be dehydrated and a hydrocarbon boiling between 60 and 145° C., operating the still so as to distil over a ternary azeotrope consisting of the hydrocarbon, the water in the aqueous acetonitrile and part of the acetonitrile, and to leave in the lower part of the still acetonitrile substantially free from water, removing from the still said acetonitrile substantially free from water, allowing the distilled ternary azeotrope to separate into two layers, the upper of which contains the major proportion of the hydrocarbon and the lower one the major proportion of the water, removing the upper layer and returning it to an intermediate point of the column still, distilling the lower layer to give a fraction rich in non-aqueous constituents, and returning the said fraction to an intermediate point of the column still.

5. In a process of removing water from aqueous acetonitrile, the step which comprises adding thereto benzene in amount sufficient to form a ternary azeotrope with acetonitrile and water and removing the resultant ternary azeotrope in vapor form.

6. In a process of removing water from aqueous acetonitrile, the step which comprises adding thereto toluene in an amount sufficient to form a ternary azeotrope with acetonitrile and water and removing the resultant ternary azeotrope in vapor form.

7. In a process of removing water from aqueous acetonitrile, the step which comprises adding thereto an isomeric form of xylene in an amount sufficient to form a ternary azeotrope with acetonitrile and water and removing the resultant ternary azeotrope in vapor form.

HENRY R. C. PRATT.